Figure 4:
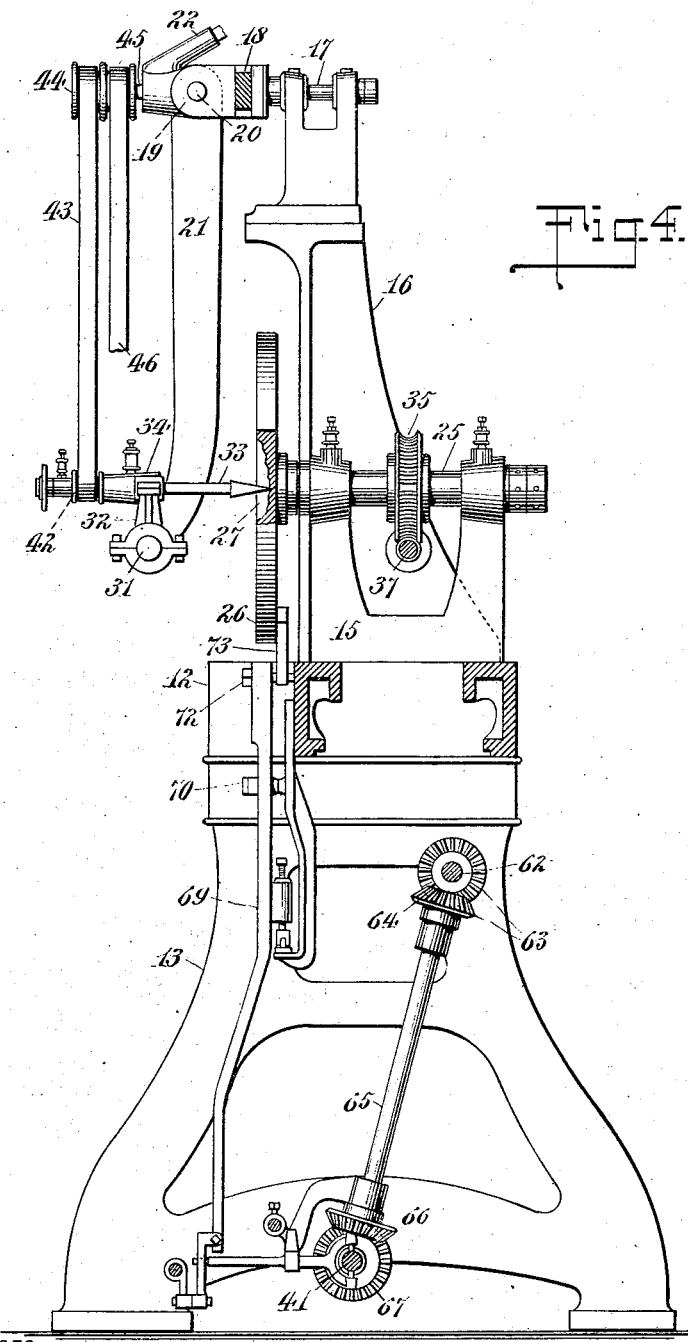

No. 877,436. PATENTED JAN. 21, 1908.
J. F. KELLER.
MACHINE FOR ENGRAVING OR SINKING DIES.
APPLICATION FILED OCT. 1, 1907.
7 SHEETS—SHEET 1.
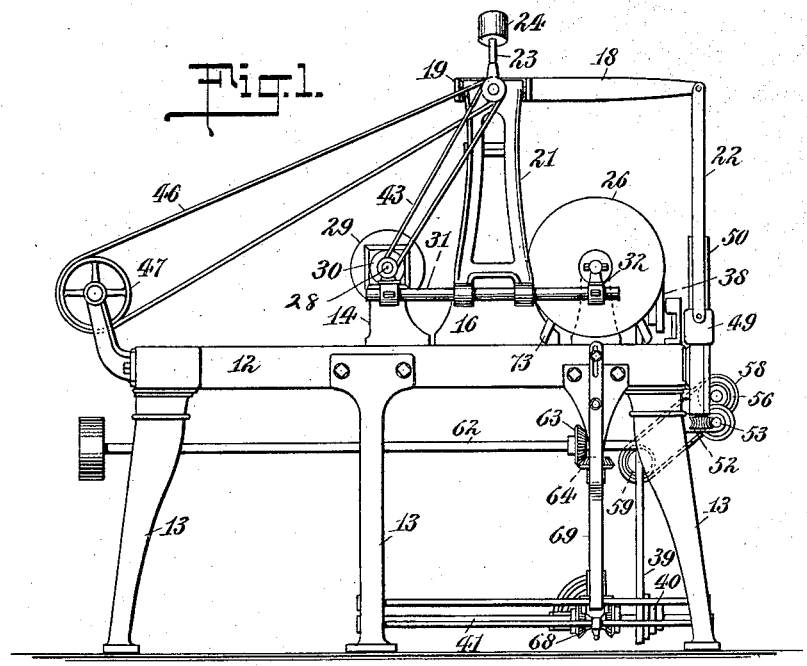
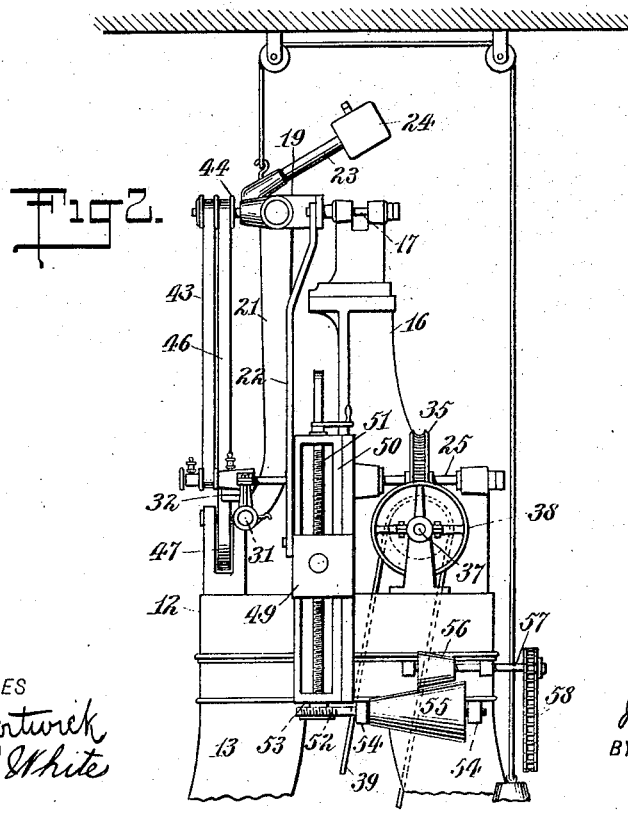
WITNESSES
INVENTOR
BY
ATTORNEY No. 877,436. PATENTED JAN. 21, 1908.
J. F. KELLER.
MACHINE FOR ENGRAVING OR SINKING DIES.
APPLICATION FILED OCT. 1, 1907.
7 SHEETS—SHEET 2.
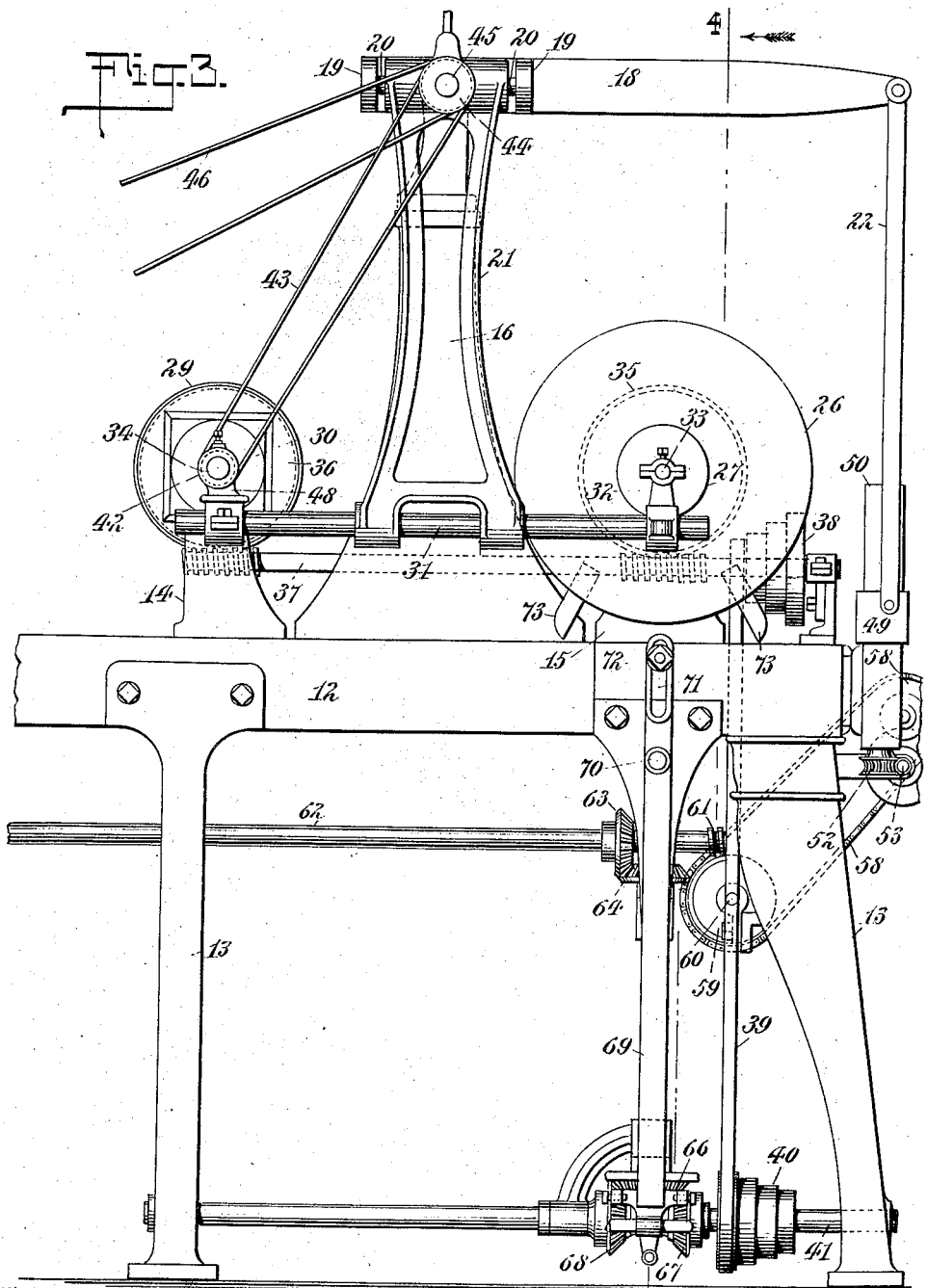
WITNESSES
INVENTOR
Joseph F. Keller
BY George Carr
ATTORNEY No. 877,436.　　　　　　　　　　　　　PATENTED JAN. 21, 1908.
J. F. KELLER.
MACHINE FOR ENGRAVING OR SINKING DIES.
APPLICATION FILED OCT. 1, 1907.
7 SHEETS—SHEET 3.

WITNESSES
INVENTOR
BY
ATTORNEY

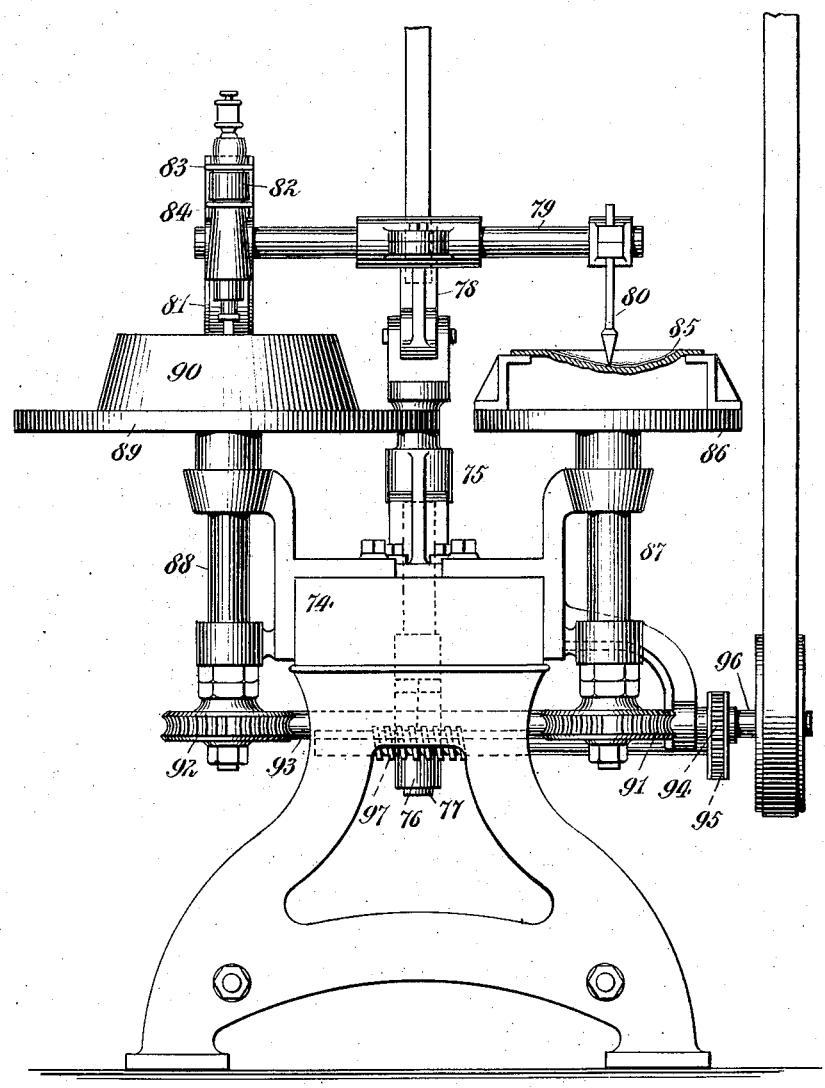

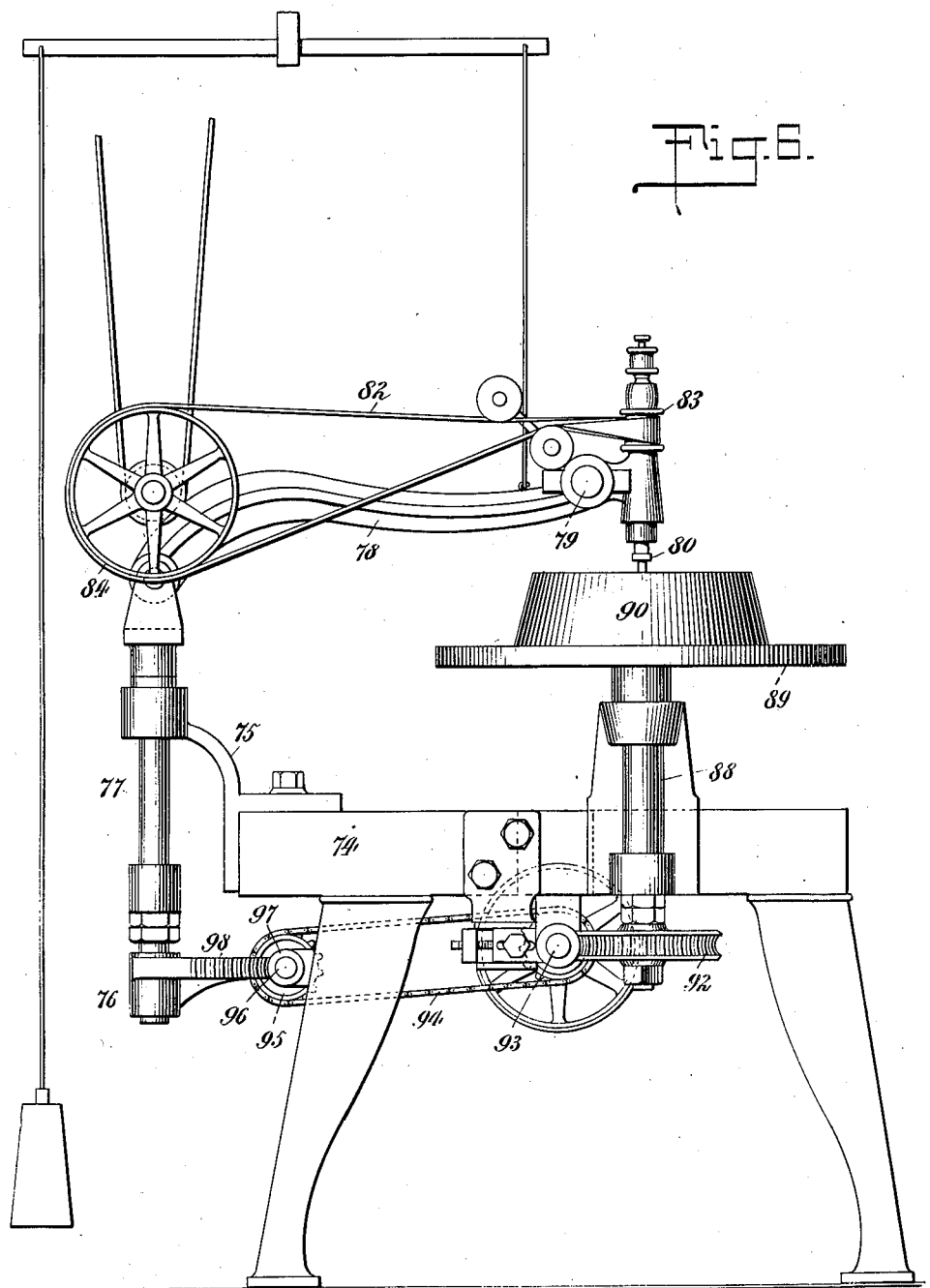

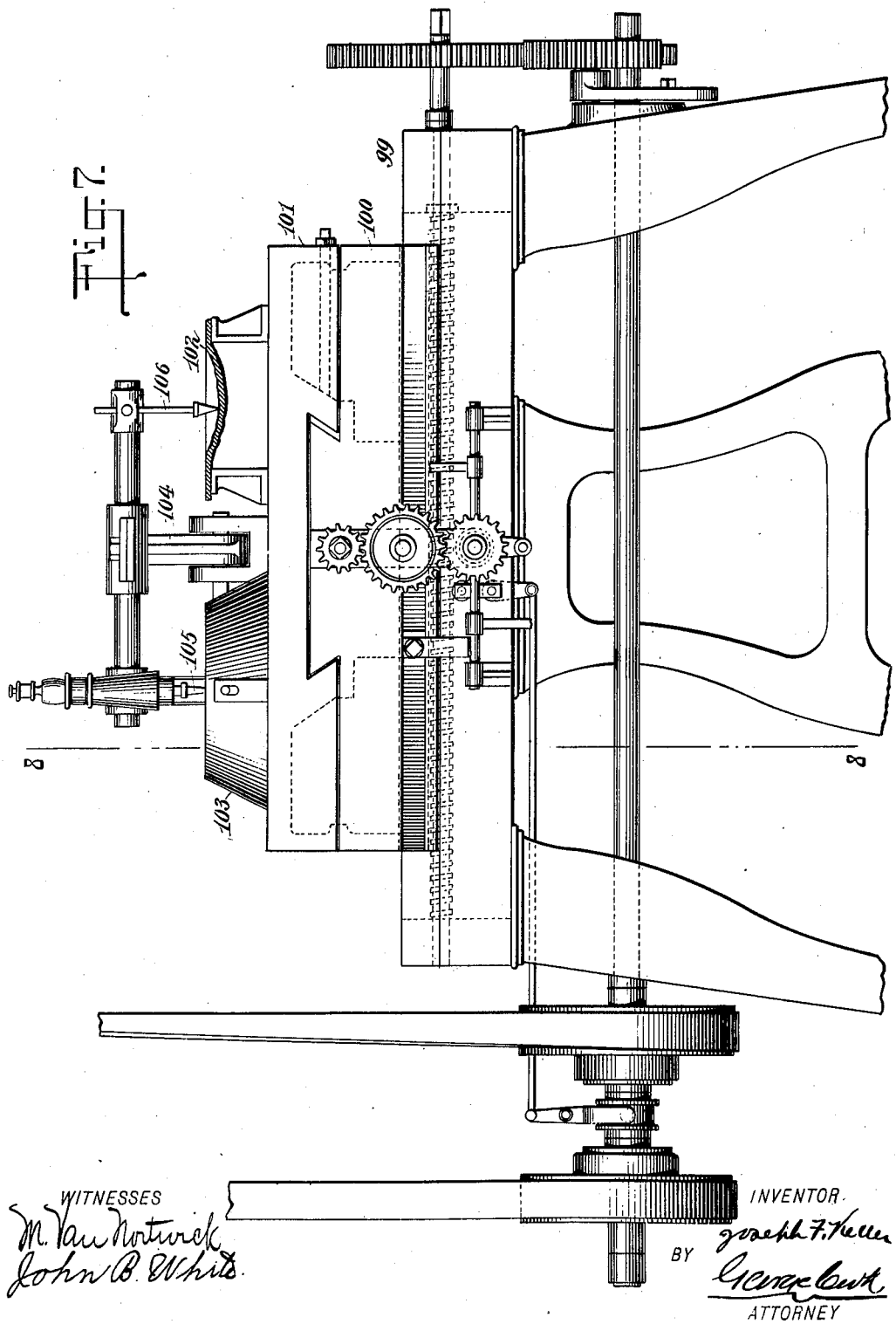

No. 877,436. PATENTED JAN. 21, 1908.
J. F. KELLER.
MACHINE FOR ENGRAVING OR SINKING DIES.
APPLICATION FILED OCT. 1, 1907.
7 SHEETS—SHEET 7.
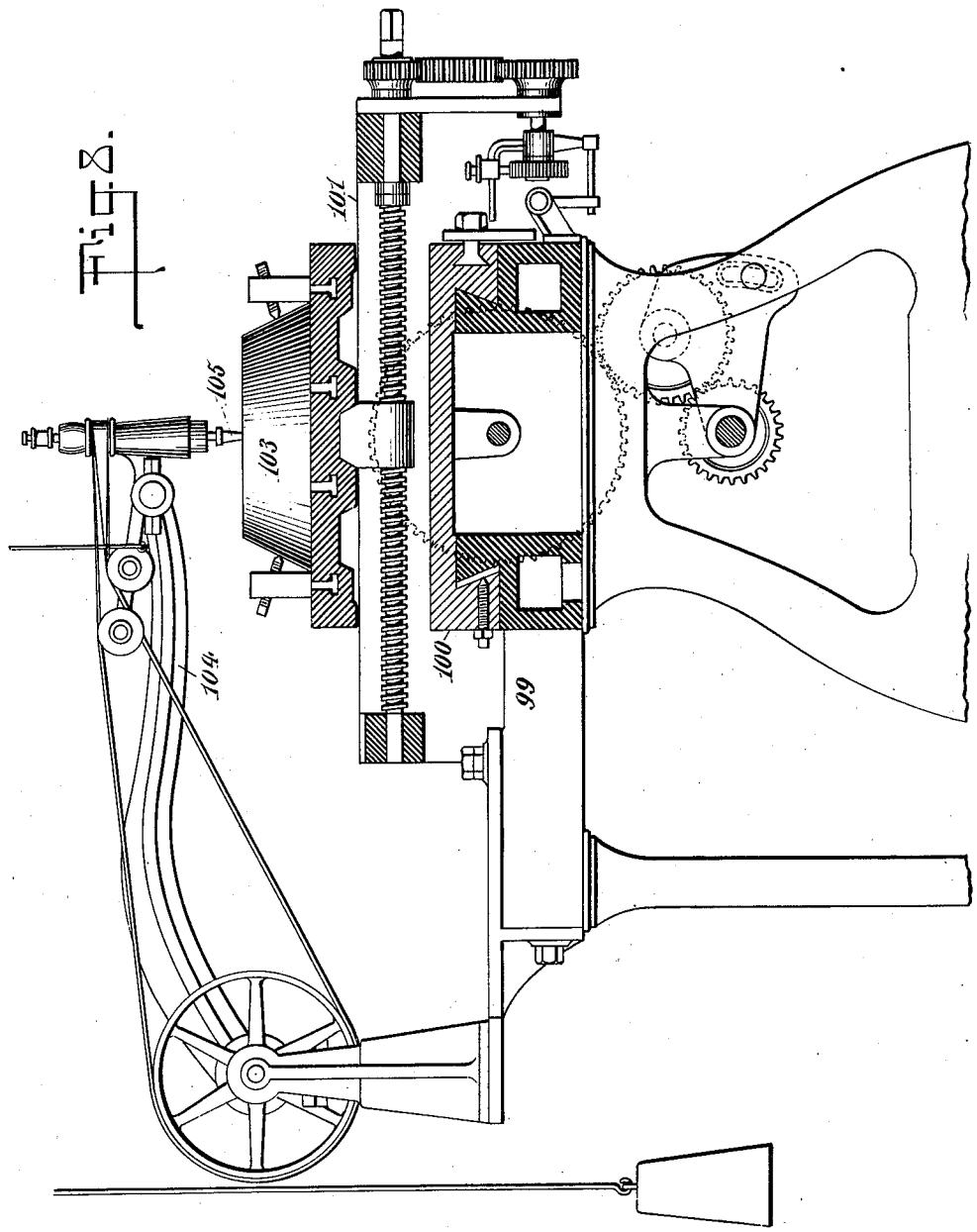
WITNESSES
INVENTOR
ATTORNEY

UNITED STATES PATENT OFFICE.

JOSEPH FINK KELLER, OF NEW YORK, N. Y.

MACHINE FOR ENGRAVING OR SINKING DIES.

No. 877,436.          Specification of Letters Patent.          Patented Jan. 21, 1908.

Application filed October 1, 1907. Serial No. 395,374.

*To all whom it may concern:*

Be it known that I, JOSEPH FINK KELLER, a citizen of the United States, and a resident of New York, borough of Manhattan, in the county of New York and State of New York, have made and invented certain new and useful Improvements in Machines for Engraving or Sinking Dies, of which the following is a specification.

My invention relates to an improvement in machines for engraving or sinking dies, and particularly to that style or character of machine patented to L. F. Campi, June 27th, 1893, No. 500,317, and in Letters Patent granted to me December 31st, 1903, No. 690,026. In these patents are described a machine especially adapted for engraving or sinking dies of a larger or smaller size than the templet, pattern or model from which it is to be copied, the difference in size resulting from the fact that the swinging bar carrying the pointer or tracer, and the cutting tool is fulcrumed or pivoted at one end, said pointer or tracer and the cutting tool lying on the same side of the pivot or fulcrum. In the present instance, it has been my purpose to so construct a machine that the die will be an exact reproduction of the templet or pattern, including the size thereof, and to effect this result, I so construct and arrange the several parts that the pivot or fulcrum of the bar carrying the pointer or tracer and the cutting tool, will be in a line equidistant from the centers of the die under formation, and the templet or pattern from which it is copied.

With these and other ends in view, my invention consists in certain novel features of construction and combinations of parts as will be hereinafter fully described and pointed out in the claims.

In the accompanying drawings Figure 1 is a view in front elevation of my improved machine. Fig. 2 is an end view of a portion thereof. Fig. 3 is an enlarged front view with portions broken away to more clearly show the reversing mechanism. Fig. 4 is a vertical cross section taken on the line 4—4 of Fig. 3, looking in the direction of the arrow. Fig. 5 is a front view of a modified form of the machine, and Fig. 6 an end view of the same. Fig. 7 is a front view of another modified form of the machine, and Fig. 8 is a sectional view thereof taken on the line 8—8 of Fig. 7.

Referring to the drawings, 12 represents the bed of the machine supported by the legs or standards 13, and upon which are adjustably secured the head stocks 14—15 for supporting the two parallel transverse spindles, upon one of which is mounted the templet or pattern, and on the other the metal out of which the die is to be cut, as hereinafter explained. On the bed of the machine is also secured the bracket 16, in the upper portion of which is mounted the spindle 17, the latter having tightly secured thereto the lever 18, provided with flanges 19 forming bearings for the lugs or projections 20 formed on the upper end of the oscillating arm or bracket 21, the opposite end of the lever 18 being pivotally secured to the connecting rod 22, this construction and arrangement of parts allowing a swinging or oscillating movement of the lower end of the arm 21 transversely of the machine and also an oscillating movement thereof lengthwise of the machine when the outer end of the lever 18 is raised or lowered by the connecting rod 22. To counterbalance the weight of the arm 21 and its attached parts so that the same may oscillate freely in a direction transversely of the machine, I secure to the upper end thereof, the lever 23, having secured to its outer free end the weight 24, as clearly illustrated in Fig. 2 of the drawings.

In the head stock 15 is mounted the transverse spindle 25, upon one end of which is secured the chuck 26 for holding the templet or pattern 27, and in the head stock 14 is mounted the spindle 28 parallel to the former one, and upon one end of which is secured the chuck 29 for holding the die blank 30, the fulcrum or pivot of the arm 21 being in a vertical line equidistant from the two spindles 25—28.

The lower free end of the oscillating arm 21 has mounted therein the horizontal bar or rod 31, to which is secured on one side of said arm, a suitable bracket 32, carrying the pointer or tracer 33, and upon the opposite side of said arm 21 a suitable bearing 48 in which rotates a cutting tool 34, the pointer or tracer 33 being kept in contact with the model or pattern 27, and the revolving cutting tool 34 in contact with the metal 30 from which the die is to be cut, by reason of the weight of the arm 21 and its attached rod or shaft 31.

As described in the patents above referred to, movement is imparted to the parallel spindles 25—28, and the parts attached thereto, by means of the gears 35—36, shown in dotted lines in Fig. 3, which mesh with the shaft 37, the latter receiving its motion through the pulley 38 secured thereto, and over which passes the belt 39, the latter also passing over the pulley 40 secured to the shaft 41.

To the outer end of the cutting tool is secured a pulley 42, over which passes the belt 43, the latter also passing over a pulley 44 turning on the rod 45, the pulley 44 also having a belt 46 passing over the same, which belt in turn passes over the pulley 47, to which is imparted a rotating movement from any suitable source, and whereby motion is imparted to the cutting tool 34.

To the lower end of the connecting rod 22, is secured the slide 49 traveling vertically on the frame 50 secured tightly to the frame of the machine, said block or slide 49 having a threaded opening through which passes a threaded bar 51, the upper and lower ends of the latter being mounted in said frame 50. The extreme lower end of the said threaded bar 51 is provided with the gear 52 meshing with the worm formed on the end of the shaft 53, the latter mounted in bearings 54 secured to the frame of the machine, and carrying the cone pulley 55 meshing with a similar cone 56 secured to the shaft 57, the outer or extreme end of the latter being provided with a sprocket over which passes the chain 58. This chain also passes over a similar sprocket 59 mounted on a shaft 60, said shaft also carrying a gear meshing with the worm 61 formed on the extreme end of the main driving shaft 62, and from which it receives its motion.

From the foregoing description it will be understood that when the threaded rod 51 is given a slow rotating motion (indirectly from the main driving shaft), the threaded block 49 through which said rod passes, will be gradually lowered, thereby gradually lowering the outer end of the lever 18 and causing the lower end of the oscillating arm 21 to swing lengthwise of the machine, and in the arc of a circle. This movement of the arm 21 causes a similar movement of the bar 31, which results in the pointer or tracer in engagement with the templet or pattern and the cutting tool in engagement with the die under formation, to travel outwardly from the centers of said pattern and die to the outer edges thereof, and as the oscillating arm 21 is pivoted to the lever 18, it is at the same time allowed an oscillating motion transversely of the machine, whereby to permit of the pointer or tracer closely following the raised and depressed portions of the templet or pattern.

It will therefore be understood that when in operation, the bar 31 secured to the oscillating arm 21, is allowed to swing backwardly and forwardly, allowing its attached pointer or tracer 33 to follow closely the contour of the pattern or model and at the same time is gradually moved lengthwise of the machine causing the pointer or tracer to slowly and gradually travel from the center of the pattern or model to the outer edge thereof, and as said oscillating arm is fulcrumed at a point equally distant from the centers of the die and pattern, the former will be an exact reproduction both in size and outline of the model.

The model or pattern and the die blank under formation, may as described in the patent to Campi, be given a rotating motion, or as described in the patent granted to me, and before referred to, may be given an oscillating motion.

In the present instance I have shown secured to the main driving shaft 62, a bevel gear 63 meshing with a similar gear 64 secured to the upper end of a rod 65, the lower end of the latter being provided with a bevel gear 66, adapted to mesh with similar gears 67—68, both mounted on the shaft 41, and forming part of an ordinary double friction clutch. As this clutch forms no part of the invention and may be of any approved style or pattern, no detail description or illustration thereof is necessary. It is operated by the lower free end of the lever 69, fulcrumed at 70 to the frame of the machine, the upper end of said lever being provided with an elongated slot 71, in which is secured the inwardly projecting pin 72. Upon the chuck 26 carrying the pattern, or if desired, upon the pattern itself, I have secured the tripping arm 73, so disposed that when the pattern is rotated in one direction, one of the arms 73 will engage with the pin 72, forcing the upper end of the lever 69 in one direction, and the lower end of said lever in the opposite direction, throwing into operation the clutch on the shaft 41, causing it to revolve in a certain direction, the belt 39 causing the worm-shaft 37 to turn in a direction opposite to that in which it was formerly turning. The pattern will travel in this certain direction until the opposite arm 73 comes in contact with the pin 72, whereupon the lower end of the lever 69 will be shifted, thereby bringing the clutch into engagement with the shaft 41 in such way as to change its rotation, which shaft in turn through the medium of the belt 39, will change the direction of travel or rotation of the shaft 37, resulting in turning the templet or pattern in the opposite direction, and so on, it being understood that both the templet and die block are allowed to rotate in one direction until the pointer or tracer will travel from one side or edge of the surface of the model to the opposite side or edge thereof, the extent of travel of the model and die blank in either direction being wholly governed by the positions of the tripping arms 73. Instead of having the faces of the templet or pattern lying in a vertical plane and their respective spindles in a horizontal plane, the positions may if desired, be reversed, that is, the spindles may lie in a vertical plane and the faces of the die blank or pattern in a horizontal plane, as illustrated in Figs. 5 and 6, wherein 74 represents the bed of the machine provided with the bracket 75 and bearing 76 for supporting the rod 77, the latter carrying the arm 78 corresponding to the oscillating arm 21 of Figs. 1, 2, 3, and 4, said arm 78 being provided with the rod 79, which in turn has mounted thereon the pointer or tracer 80 and the revolving cutting tool 81, a rotating motion being imparted to said cutting tool by means of the belt 82 passing around the pulley 83 secured to said cutting tool and the pulley 84, substantially as in the instance of the machine as first described.

The templet or pattern 85 is secured to the chuck 86 mounted upon the spindle 87, the opposite spindle 88 carrying the chuck 89 to which is secured the die blank 90, the faces of said templet or pattern 85 and die blank 90 being in a horizontal plane instead of a vertical plane as first described. As in the former instance the spindles 87—88 have secured thereto the gears 91—92 meshing with the worm 93, the shaft of the latter carrying a sprocket around which passes the chain 94 which also passes around a similar sprocket 95 secured to the shaft 96, the latter being provided with the worm 97 meshing with the sector or gear 98 secured to the rod 77, in order to gradually turn the same with its oscillating arm 78 and attached pointer or tracer and cutting tool so that the latter may be fed from the centers of the die and pattern to the outer edges thereof, as described in the first instance.

It will also be evident that instead of mounting the pattern and die upon parallel spindles and imparting motion thereto as described, they may be mounted upon a common bed plate as illustrated in Figs. 7 and 8, wherein 99 represents the bed of the machine having mounted thereon the sliding plate 100 adapted to travel lengthwise of the machine and dovetailed upon the latter, a plate 101 adapted to travel transversely of the machine, this latter plate having secured thereto the templet or pattern 102 and die blank 103. The oscillating arm 104 with its cutting tool 105 and pointer or tracer 106 is arranged in substantially the same manner as that shown in Figs. 5 and 6, the feeding mechanism connected with the sliding plates 100—101 and tripping mechanism being substantially similar in construction and arrangement as that employed in horizontal milling machines, and as such forms no part of the present invention, no detail description thereof is necessary.

In all the foregoing instances, however, it will be understood that the oscillating arm carrying the rod or bar upon which are mounted the tracer and cutting tool, is fulcrumed or pivoted at a point equidistant from the centers of the pattern and die blank, being moved simultaneously to preserve the relation between the parts, in order that the die may be an exact reproduction in contour and size as the pattern from which it is copied.

Having fully described my invention, what I claim as new and desire to secure by Letters Patent, is:—

1. In a machine for the reproduction of a die from a pattern, the combination with an oscillating arm pivotally supported at one end, of die blank and pattern holders for supporting the die blank and pattern respectively and both located upon the same side of said oscillating arm, means for simultaneously moving said holders, and a cutting tool and tracer carried by said oscillating arm and engaging with said die blank and pattern respectively and located at points equidistant from the pivotal support of said oscillating arm, substantially as described.

2. In a machine for reproducing a die from a pattern, the combination with die blank and pattern holders for supporting the die blank and pattern respectively, and means for simultaneously moving said holders, a single arm adapted to oscillate with relation to said holders and pivoted at a point equidistant from the centers of said holders, a cutting tool and tracer mounted on said oscillating arm and engaging with said die blank and pattern respectively, and means for feeding said cutting tool and tracer across the surfaces of said die blank and pattern, substantially as described.

3. In a machine for reproducing a die from a pattern, the combination with two parallel spindles one carrying the pattern and the other the die blank, of means for imparting motion thereto, an arm adapted to oscillate with relation to said die blank and pattern and pivoted at a point equidistant from the centers of said die blank and pattern, and a tracer and cutting tool secured to said oscillating arm and engaging with the pattern and die blank respectively, substantially as described.

4. In a machine for reproducing a die from a pattern, the combination with two parallel spindles one carrying the die blank and the other the pattern, of means for imparting motion thereto, an oscillating arm pivoted to the machine at a point equidistant from the centers of said die blank and pattern, a tracer and cutting tool carried by said arm and engaging with the pattern and die blank respectively, and means for moving said oscillating arm in a plane parallel with the faces of said die blank and pattern, whereby said cutting tool and tracer are gradually fed across the surfaces of said die blank and pattern, substantially as described.

5. In a machine of the character described, the combination with two parallel spindles, one carrying the pattern and the other the die blank and tripping means for automatically changing the direction of the movement thereof, of an oscillating arm pivoted to the machine at a point equidistant from the centers of said pattern and die blank, a bar carried by said arm, a tracer and revolving cutting tool carried by said bar and engaging with the pattern and die blank respectively, and means for swinging said oscillating arm parallel to the plane of the faces of said pattern and die blank whereby the tracer and cutting tool will be moved across said faces, substantially as described.

6. In a machine of the character described, the combination with two parallel spindles one carrying the pattern and the other the die blank, of means for imparting the same motion thereto, tripping mechanism secured to one of said spindles and engaging with the driving shaft whereby the direction of movement of said spindles and the attached pattern and die blank is automatically changed, a tracer and revolving cutting tool engaging with the pattern and die blank, an oscillating arm pivoted to the machine at a point equidistant from the centers of said pattern and die blank, and means for feeding said tracer and cutting tool across the faces of said pattern and die blank, substantially as described.

7. In a machine for reproducing a die from a pattern, the combination with a die blank holder and a pattern, means for simultaneously moving said die blank holder and pattern, an arm adapted to oscillate with relation to said die blank holder and pattern, and pivoted at a point equidistant from the centers of said die blank holder and pattern, a tracer and cutting tool mounted on said oscillating arm and engaging with the pattern and die blank respectively, and tripping mechanism adapted to change the direction of travel of said die blank holder and pattern, substantially as described.

Signed at New York, borough of Manhattan, in the county of New York, and State of New York, this 14th day of September, A. D. 1907.

JOSEPH FINK KELLER.

Witnesses:
SIDNEY A. KELLER,
JULE DIENKS.